United States Patent [19]
Wood

[11] Patent Number: 4,483,834
[45] Date of Patent: Nov. 20, 1984

[54] GAS TREATING PROCESS FOR SELECTIVE $H_2S$ REMOVAL

[75] Inventor: Douglas A. Wood, Houston, Tex.

[73] Assignee: UOP Inc., Des Plaines, Ill.

[21] Appl. No.: 463,364

[22] Filed: Feb. 3, 1983

[51] Int. Cl.³ .............................................. C01B 17/16
[52] U.S. Cl. .................................... 423/228; 423/220; 423/226; 423/232; 55/73
[58] Field of Search ............... 423/220, 226, 228, 232; 55/73

[56] References Cited
U.S. PATENT DOCUMENTS 3,989,811 11/1976 Hill ...................................... 423/228
4,025,322 5/1977 Fisch ................................... 423/228

Primary Examiner—John F. Niebling
Assistant Examiner—B. J. Boggs, Jr.
Attorney, Agent, or Firm—James R. Hoatson, Jr.; John F. Spears, Jr.; William H. Page, II

[57] ABSTRACT

A process is disclosed for treating carbon dioxide-containing gas streams, such as a natural gas, to selectively remove hydrogen sulfide. The process employs an absorption-stripping sequence in which hydrogen sulfide and carbon dioxide are removed from the feed gas. The net overhead vapor of the stripping column is compressed and dried and passed into a fractionation column. Relatively high purity hydrogen sulfide is withdrawn from the bottom of the fractionation column, and the net overhead vapor of the fractionation column is recycled back to the absorption zone.

17 Claims, 1 Drawing Figure

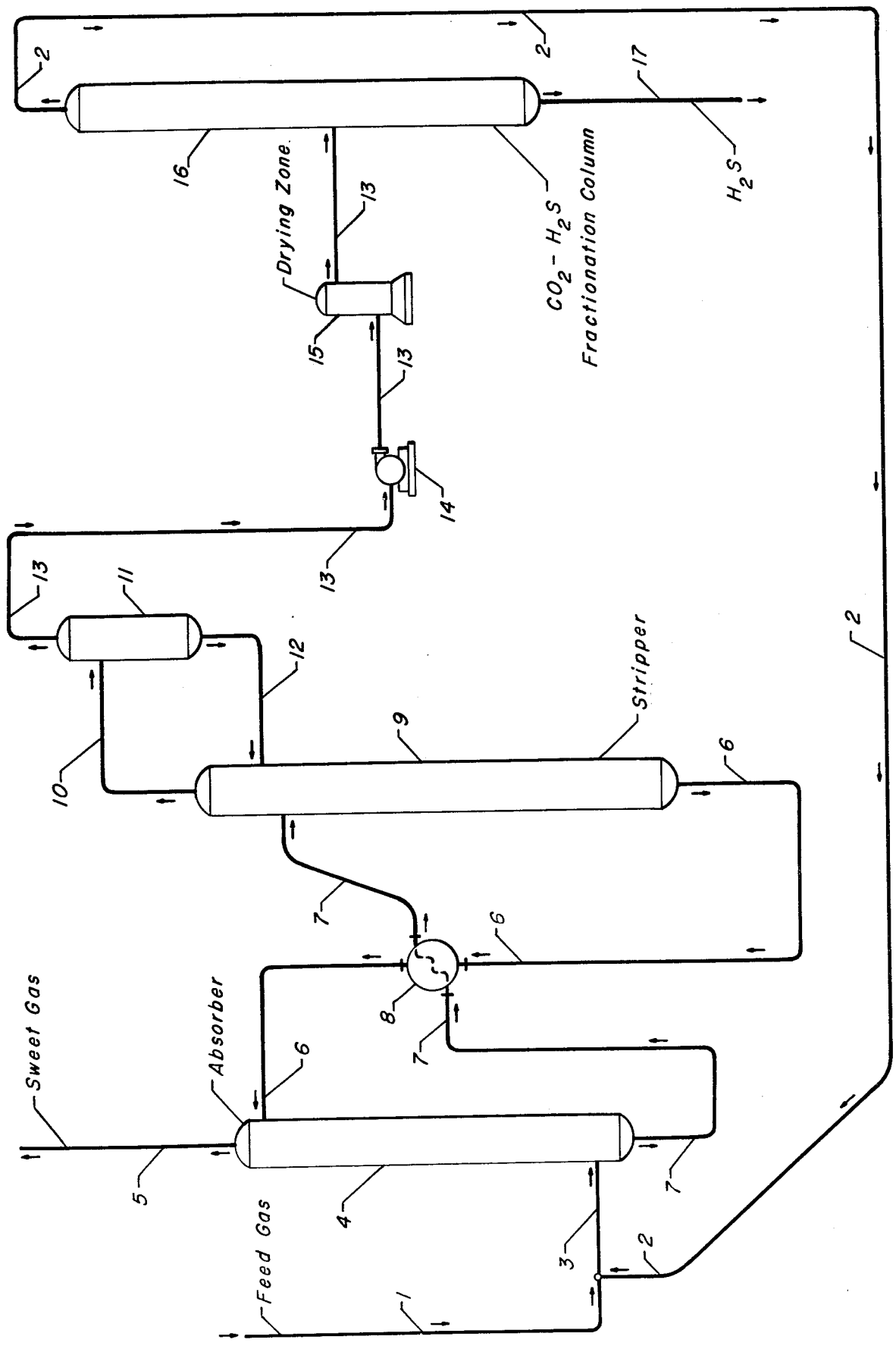

GAS TREATING PROCESS FOR SELECTIVE H₂S REMOVAL

FIELD OF THE INVENTION

The invention relates to a process for treating or purifying gas streams by removing a selected chemical compound from the gas stream. The invention therefore relates in general to a process for treating a gas stream comprising a light hydrocarbon, such as a natural gas stream, to remove a chemical contaminant. The invention directly relates to the removal of the so-called acid gases from gas streams through the use of an absorbent liquid in an absorption zone, with the resultant rich liquid being subsequently regenerated by an increase in temperature and/or a reduction in pressure in a stripping zone. The invention directly relates to such a gas treating process in which it is desired to effect at least a partially selective removal of hydrogen sulfide from a gas stream which also contains carbon dioxide to thereby produce an off-gas stream of an acceptably high hydrogen sulfide concentration while minimizing the loss of carbon dioxide.

PRIOR ART

The use of absorption-stripping techniques to remove acid gases from gas streams is well developed technology which is in widespread commercial use. A general description of commonly used process flows, liquid absorbents and conditions is provided in an article at page 78 of the Mar. 10, 1975 issue of *The Oil and Gas Journal* and at pages 15-19 to 15-24 of the *Engineering Data Book*, 9th ed. by the Natural Gas processers Suppliers Association, Tulsa, Okla., 1972.

The following are specific examples of absorption processes used to treat gas streams. They are believed to be pertinent because of their emphasis on the removal of hydrogen sulfide over carbon dioxide and their recognition of the advantages of minimizing the carbon dioxide content of the hydrogen sulfide product streams. In U.S. Pat. No. 3,837,143 issued to J. Sutherland et al, a natural gas stream is sweetened using a dialkyl ether of a polyalkylene glycol as a solvent. In this process, the solvent is regenerated first by flashing at a reduced pressure to liberate carbon dioxide followed by passage of the solvent into a reboiled stripping column. The flashed gas is recompressed and passed into the absorber to reduce the quantity of carbon dioxide in the gas charged to a Claus unit sulfur plant. U.S. Pat. No. 4,085,192 issued to R. Van Scoy describes a process for selectively removing hydrogen sulfide from a gas stream containing both hydrogen sulfide and carbon dioxide. The process employs an absorption column of specific design and a regenerated absorbent which has a very low hydrogen sulfide content. As in many such processes, the product gas is the net gas from the stripping column. U.S. Pat. No. 4,093,701 issued to K. Butwell is also pertinent for its showing of the present level of the art for selectively removing hydrogen sulfide from a gas stream which also contains carbon dioxide. This process employs a specific class of alkanolamines and very specific contacting conditions. Like the previously cited reference, these factors tend to favor the absorption of the hydrogen sulfide over carbon dioxide in the absorption zone.

U.S. Pat. No. 4,289,738 issued to R. Pearce et al is pertinent as an example of a different approach to the selective recovery of hydrogen sulfide. In this process, two separate absorber-stripper pairs are used with gas from the first pair feeding the absorber of the second pair of absorber-strippers. The operation of the second stripper is closely controlled to maintain the desired off-gas composition.

The following two references are not believed to be as pertinent to the subject process as those cited above. However, they illustrate two different gas treating techniques which produce off-gas streams of relatively high hydrogen sulfide content from a feed gas stream which contains carbon dioxide. U.S. Pat. No. 3,531,917 issued to G. W. Grünewald et al presents a process in which hydrogen sulfide is removed in a first absorption zone followed by carbon dioxide absorption in a downstream two-stage absorption zone. The process is rather complicated and employs two multi-chamber flash towers and a reboiled stripping column to regenerate the absorption liquid. The overhead vapor streams of the flash towers 7 and 9 of FIG. 1 are shown as being recycled and admixed with the feed gas stream entering the first absorption zone. U.S. Pat. No. 4,345,918 issued to H. Meissner presents a gas treating process in which the rich solvent is fed to three different fractionation zones in series. Each fractionation zone is operated at more highly regenerative conditions which selectively drive off one of the gases picked up in the absorber. Lean (regenerated) solvent is fed to each fractionator as reflux.

BRIEF SUMMARY OF THE INVENTION

The invention provides a relatively simple and economically attractive process for selectively recovering hydrogen sulfide from a gas stream. The invention comprises the unique step of passing the overhead vapor stream of a solvent stripping column into a fractionation zone in which the hydrogen sulfide-carbon dioxide mixture of the overhead vapor stream is partially fractionated. This concentrates carbon dioxide into a net overhead stream which is recycled to the absorption zone. A broad embodiment of the process may be characterized as a process for removing hydrogen sulfide from a gas stream containing carbon dioxide which comprises the steps of contacting a hereinafter characterized recycle stream and a feed stream which comprises hydrogen sulfide and carbon dioxide with a lean acid gas absorbing liquid in an absorption zone operated at absorption-promoting conditions and thereby forming a rich acid gas absorbing liquid and a product gas stream; passing rich acid gas absorbing liquid into a regeneration zone operated at regeneration conditions and thereby forming lean acid gas absorbing liquid, which is returned to the absorption zone, and a net regeneration zone gas stream comprising hydrogen sulfide and carbon dioxide; and separating the regeneration zone overhead gas stream by fractionation in a fractionation zone operated at fractionating conditions and thereby forming a net fractionation zone overhead stream, which is at least partially employed as said recycle stream, and a net bottoms stream comprising hydrogen sulfide.

DESCRIPTION OF THE DRAWING

The drawing is a simplified flow diagram of a commerical unit designed to practice the subject process. This representation of one preferred embodiment of the subject process is not to exclude from the scope of the inventive concept those other embodiments set out herein or which are the result of the reasonable and expected modification of those embodiments.

Referring now to the drawing, a feed gas stream comprising a mixture of light hydrocarbons, hydrogen sulfide and carbon dioxide enters the process through line 1 and is admixed with a recycle stream comprising hydrogen sulfide and carbon dioxide being transported in line 2. The resultant gaseous admixture is passed into the lower end of an absorber 4 through line 3. A stream of a lean absorbent liquid enters the upper end of the absorber through line 6 and flows downward through the absorber countercurrent to the rising gas. This effects the removal of substantially all the hydrogen sulfide and some carbon dioxide from the gas and thereby produces an H$_2$S-free or sweet product gas stream removed in line 5 and a rich absorbent liquid stream carried by line 7.

The rich absorbent liquid is heated by indirect heat exchange in the heat exchanger 8 and then passed into the upper end of a single column stripper 9. The stripper is operated at conditions effective to regenerate the rich absorbent liquid to thereby produce a lean absorbent liquid carried by line 6 and an overhead vapor stream carried by line 10. The overhead vapor stream comprises a mixture of hydrogen sulfide and carbon dioxide and is passed through an overhead condenser not shown and then into an overhead receiver 11. A stream of liquid overhead material is returned to the stripper through line 12 as reflux. A stream of vaporous overhead material is withdrawn through line 13 as the net overhead stream and pressurized in the compressor 14. The net overhead stream is then passed through a drying zone 15 and into an intermediate point of the reboiled fractionation column 16. The entering mixture of carbon dioxide and hydrogen sulfide is therein separated into a net bottoms stream of high purity hydrogen sulfide removed from the process in line 17 and a net overhead stream comprising a mixture of hydrogen sulfide and carbon dioxide carried by line 2. The mixture in line 2 is removed from an overhead condenser/receiver system not shown to be recycled to the absorption zone.

DETAILED DESCRIPTION

It is often desired to remove the so-called acid gases, hydrogen sulfide and carbon dioxide from a gas stream of an industrial process. This may be for the purpose of either purifying the gas stream or recovering one of the compounds as a product. For instance, hydrogen sulfide is removed from natural gas streams because it is highly poisonous and would increase atmospheric pollution if combusted without expensive pollution control systems. As another example, carbon dioxide is recovered from flue gas streams to provide carbon dioxide for use in dry ice, beverage carbonation, etc. Those skilled in the art are therefore familiar with both the utility of and the methods of acid gas removal from gas streams.

In some instances, it is desirable to selectively remove hydrogen sulfide from a gas stream containing both hydrogen sulfide and carbon dioxide. Again this may be done to purify the gas, as to remove hydrogen sulfide from a fuel gas stream while leaving most of the carbon dioxide in the fuel gas stream. It may also be desired to remove hydrogen sulfide from carbon dioxide to allow the safe transportation of the carbon dioxide. Another situation in which the selective removal of hydrogen sulfide is desired is when the hydrogen sulfide is to be charged to a Claus unit to produce sulfur or to another process in which the hydrogen sulfide is reacted. In this specific situation, it is desirable to minimize the concentration of the relatively inert carbon dioxide in the Claus unit feed stream to minimize the capital and operating costs of the Claus unit. High purity hydrogen sulfide may also be desired for the production of sulfuric acid. The commercial utility of this selective separation has led to the development of several processing techniques such as those set out above. However, it is believed that heretofore the commercially available processes for the selective removal of hydrogen sulfide from a gas stream which also contains carbon dioxide have been rather complicated and/or expensive to operate and construct. For instance they may utilize several steps of absorption and stripping in sequence in order to concentrate the H$_2$S sufficiently for further process use. It is therefore an objective of the subject invention to provide an economical process for the selective recovery of hydrogen sulfide from a gas stream which also contains carbon dioxide. It is another objective of the subject invention to provide a process for selectively removing hydrogen sulfide from such a gas stream which requires only one absorption step and one stripping step.

The feed stream to the subject process may be essentially any gas stream which is compatible with the economically feasible removal of acid gas by a regeneratable absorbent liquid. The feed stream will contain both hydrogen sulfide and carbon dioxide. It is expected that the feed stream will normally contain one or more normally gaseous (light) hydrocarbons such as methane, ethane, ethylene or propane. The feed stream may also contain hydrogen, small amounts of heavier hydrocarbons such as butane, pentane or heptane, and also various other compounds such as water and carbon monoxide. The feed stream will normally contain at least 0.01 mole percent hydrogen sulfide. It is preferred that the feed stream contains more than 0.1 mole percent hydrogen sulfide. The feed stream may be a binary mixture of carbon dioxide and hydrogen sulfide. Hence, the carbon dioxide concentration may be above 90 mole percent or more depending on the hydrogen sulfide concentration.

The feed stream to the subject process is fed to an absorption zone maintained at absorption-promoting conditions. The absorption zone may be of any commercially feasible configuration including multiple columns. It is preferred that a conventional trayed vertical column be used to provide efficient multi-stage contacting. A properly designed and operated column containing 4 to 20 trays is normally adequate as a countercurrent contactor. A packed column could be employed if desired. The entering gases are preferably passed into the lower end of this contacting column at a temperature less than about 65° C. (150° F.) and more preferably at a temperature less than 37.8° C. (100° F.). The rising gas could be cooled within the lowermost portion of the contactor by means provided for this purpose, but it is preferred that the gas stream is cooled to the desired temperature prior to entering the contactor. The absorption zone (contactor) is maintained at conditions which include a superatmospheric pressure above at least 1 psig and a temperature below about 75° C. (167° F.). It is definitely preferred that if feasible, the absorption zone is operated at a pressure above 15 psig since normally higher pressures promote absorption. The delivery pressure of the feed gas stream may largely dictate the operating pressure of the absorption zone since compressing the feed stream would increase the cost and operating expense of the process. Similarly it is preferred that a lower temperature is maintained in the absorption zone to aid absorption, with temperatures below about 37.8° C. (100° F.) being especially preferred. This temperature should not be exceeded at any point within the contactor, which may employ interstage coolers for temperature control. The desired rate of flow of the absorbent liquid will be dependent on many variables including the composition of the absorbent liquid, the desired operating conditions and the composition of the gas being contacted. Guidelines for most common absorbent liquids are available in standard references and are known to those skilled in the art. the absorption zone should be operated and designed to minimize the absorption of carbon dioxide consistent with the desired degree of hydrogen sulfide removal. Normally it will be desired to remove all of the hydrogen sulfide but less than total removal may be acceptable in a particular process.

Proper operation of the absorption zone results in the production of an absorbent liquid stream containing a greater amount of both hydrogen sulfide and carbon dioxide than the absorbent liquid which is passed into the absorption zone. This liquid stream is referred to herein as the rich absorbent liquid stream. It is preferred that the absorbent liquid comprises an aqueous solution and an aqueous amine solution is especially preferred. This may be methyldiethanolamine (MDEA), monoethanolamine (MEA), diethanolamine (DEA), triethanolamine (TEA), diisopropanolamine (DIPA), diglycolamine (DGA) (2-[2-aminoethoxy]ethanol), etc. The use of MDEA is preferred. The concentration of the MDEA is preferably about 50 wt.%. When MDEA is used as the absorbent liquid, the total accumulation of carbon dioxide and hydrogen sulfide in the absorbent liquid is generally kept less than 0.40 mole of acid gas per mole of MDEA. Operation with other absorbent liquids and other absorbent loadings and concentrations is also acceptable. These alternative absorbent liquids include an aqueous solution of potassium carbonate, a solution comprising sulfolane (tetrahydrothiophene dioxide), anhydrous propylene carbonate, dimethyl ethers of polyethyleneglycols and methanol. Both chemical and physical absorbent liquids may be employed.

The acid gas loaded rich absorbent liquid is removed from the absorption zone and transferred to a regeneration zone which is often referred to in the art as a stripper or stripping column. The preferred amine-type absorbents generally release carbon dioxide at temperatures above about 100° C. (212° F.). The absorbent regeneration zone is therefore operated at a higher temperature than the absorption zone. It is desirable to operate the regeneration zone at the highest feasible temperature to minimize gas compression requirements. A broad range of regeneration conditions includes a bottoms temperature of between about 100° C. and about 135° C. (275° F.). Temperatures above the upper end of this range tend to cause degradation of the preferred amine solutions and are therefore to be avoided with amine solutions. For amine solutions, the pressure in the regeneration zone is preferably between approximately 5 and 45 psig as measured at the top of the regeneration zone apparatus. Temperatures and pressures outside these rather limited ranges may also be employed if desired for nonamine absorbent liquids. The preferred regeneration zone configuration is a rather conventional vertical packed or trayed stripping column having the equivalent of between 15 and 30 actual trays. The rich absorbent liquid preferably enters several trays below the top of the stripping column, which receives external reflux on its uppermost tray. The use of an external reboiler is preferred. A separate reclaimer may be employed if required. A thorough article on the operation of amine-type absorption systems is provided at page 115 of the May 12, 1980 edition of *The Oil and Gas Journal.* Other regeneration methods may be required if an absorbent liquid other than the preferred amine-type absorbent is utilized in the process.

The regeneration zone produces a net stream of regenerated absorbent liquid which is referred to as the lean absorbent liquid. This liquid stream is cooled, pressurized and passed into the absorption zone. The regeneration zone also produces a net effluent gas stream, which is the net overhead gas stream of the stripping column in the preferred regeneration zone configuration. This gas stream will contain the hydrogen sulfide and carbon dioxide released during the regeneration of the absorbent liquid. This gas should have a very low concentration of the "nonacid gas" components of the feed gas stream such as methane or hydrogen. Preferably this gas stream contains over 10 mole percent hydrogen sulfide. The gas stream may contain water, especially if the absorbent liquid is an aqueous solution. In this instance, it is preferred that the gas stream is compressed and passed through a drying zone operated at conditions effective to reduce the water content of the gas stream to a level which does not interfere with the successful operation of the downstream fractionation zone. Specifically, care must be taken to avoid the condensation of water in the overhead receiver of the downstream fractionation column. Any feasible type of drying method may be employed for this purpose. Cryogenic methods are not preferred as they tend to effect the condensation of carbon dioxide before sufficient water is condensed. The use of a solid desiccant such as molecular sieves is preferred. Several separate beds of the desiccant may be employed on a rotating or swing basis. Pressure swing regeneration is especially preferred. The desiccant bed being regenerated is vented (depressurized) to the suction of the first stage compressor used to pressurize the gas. Water is then condensed out in the compressor effluent cooling and liquids knockout system. This results in no loss of process gas. Spent beds of the desiccant may alternatively be regenerated through the use of a warm, dry gas stream, with the regeneration gases being discharged from the process or passed into the regeneration zone or absorption zone for the recovery of any hydrogen sulfide contained in these gases.

The dried gas stream produced in the regeneration zone is then partially fractionated in a fractionation zone maintained at fractionation conditions. It is preferred that a single vertical packed column is employed as the fractionation zone. The fractionation zone could however take other configurations if so desired. For instance, the fractionation zone could comprise a single trayed column or two or more separate but interconnected columns. In the latter instance, the overhead or bottoms stream of one column can be charged into the second column as the sole feed stream of the column. The preferred fractionation column has an external overhead condenser and a bottoms reboiler. A suitably designed column having about 15 theoretical trays will normally be adequate for the desired separation. The feed stream should enter this single column at an intermediate point to provide adequate stripping and rectification sections.

The fractionation zone is operated at conditions which result in the separation of the entering compounds into a bottoms liquid which comprises high purity hydrogen sulfide and an overhead stream comprising a mixture of hydrogen sulfide and carbon dioxide. The net bottoms stream of the fractionation column should contain less than 10% carbon dioxide with the remainder being mostly hydrogen sulfide. The net bottoms stream should contain at least 90 mole percent hydrogen sulfide, but could contain a lower amount such as 60 mole percent if desired. Preferably this stream contains 95 mole percent hydrogen sulfide and more preferably contains over 99 mole percent hydrogen sulfide. The mole ratio of hydrogen sulfide to carbon dioxide in the fractionation zone overhead gas must not exceed this same ratio in the gas stream produced by regeneration of the absorbent liquid. The overhead stream may be removed as a liquid but is preferably a gas. At the operating conditions maintained in the top of the fractionation zone, the relative volatility of the highly non-ideal hydrogen sulfide-carbon dioxide mixture is low and the mixtures approach azeotropic behavior. The required fractionation conditions include an elevated pressure and a temperature which is rather low for fractionation systems. The minimum pressure maintained in the fractionation zone will normally be set by the temperature of the coolant available for use in the overhead condenser. A broad range of operating pressures starts at about 200 psig and continues up to an upper limit set by the costs of constructing and/or operating a very high pressure fractionation column. The upper limit on the operating pressure is the critical pressure of hydrogen sulfide or 1,036 psia. A preferred range of fractionation zone operating pressures is from about 300 to about 700 psig. The operating temperature of the fractionation zone is basically set by the overhead pressure and will be below 88° F. (critical temperature of carbon dioxide), with this specified temperature being the temperature of the overhead vapor of the zone. A range of preferred overhead operating temperatures is from about −5° F. to about 55° F.

The overhead product of the fractionation column is passed into the absorption zone. This may be achieved by admixing this recycle gas stream with the feed gas stream or by independently passing the overhead product into the absorption zone above or below the feed point. The overhead product of the fractionation zone is preferably at a relatively low temperature and can therefore be employed as a source of refrigeration (cooling) within the overall process. For instance, the fractionation column overhead may be heated by indirect heat exchange against the feed to the fractionation column, the lean absorbent liquid being passed into the absorption zone or against absorbent liquid at some point within the absorption zone. The refrigeration capacity of the overhead of the fractionation zone may be used to directly cool the feed gas to the absorption zone by admixture with the feed gas stream. The bottoms product of the fractionation column is also a source of refrigeration which may be employed at various points in the process, as by indirect heat exchange against the feed stream to the fractionation column.

A preferred embodiment of the invention may accordingly be characterized as a gas treating process which comprises the steps of passing a hereinafter characterized gas recycle stream and a feed gas stream comprising a $C_1$ to $C_3$ hydrocarbon, hydrogen sulfide and carbon dioxide into an absorption zone operated at absorption-promoting conditions and upward therein countercurrent to an acid gas absorbing liquid and thereby forming a rich acid gas absorbing liquid stream and a sweetened product gas stream having a lower hydrogen sulfide concentration than the feed gas stream; passing the rich acid gas absorbing liquid stream into a stripping zone operated at stripping conditions and thereby forming a lean acid gas absorbing liquid stream, which is passed into the absorption zone, and a stripping zone overhead vapor stream which comprises hydrogen sulfide and carbon dioxide; compressing the stripping zone overhead vapor stream; separating the stripping zone overhead vapor stream in a fractionation zone operated at fractionating conditions into a net fractionation zone bottoms stream comprising less than 10 mole percent carbon dioxide and at least 95 mole percent hydrogen sulfide and a net fractionation zone overhead vapor stream having a lower hydrogen sulfide to carbon dioxide mole ratio than the stripping zone overhead vapor stream; recycling at least a portion of the net fractionation zone overhead vapor stream to the absorption zone as said recycle gas stream; and withdrawing at least a portion of said net fractionation zone bottoms stream from the process as a hydrogen sulfide product stream.

To ensure a complete understanding of the inventive concept, the following example is presented. This example is based on the design specifications for a commercial process unit used to selectively remove hydrogen sulfide from a fuel gas stream of a petroleum refinery. The feed gas stream has a total flow rate of approximately 7060 moles/hr of which about 4.96 mole percent is hydrogen sulfide and 36.8 mole percent is carbon dioxide. The remainder of the feed stream is composed of hydrocarbons. This gas stream is admixed with a recycle gas stream having a flow rate of approximately 700 moles/hr and the resultant admixture is passed into the bottom of a trayed absorption column. The column is operated at a pressure of about 115 psig and an average temperature of about 100° F. A sweet gas stream having a flow rate of approximately 6,710 moles is removed from the top of the absorber as the treated gas stream. This steam contains about 38.7 mole percent carbon dioxide and less than 0.1 mole percent hydrogen sulfide. The rich absorbent liquid, an aqueous solution of MDEA, is removed from the bottom of the absorption column and passed into an upper portion of a trayed stripping column. The stripping column is operated at a top pressure of about 10 psig and a bottoms temperature close to 250° F. Lean absorbent is removed from the lower part of the stripping column, cooled by indirect heat exchange and passed directly into the absorption column. A net gas stream having a flow rate of about 1040 moles/hr is removed from the overhead receiver of the stripping column. This overhead stream contains about 37 mole percent hydrogen sulfide and about 62 mole percent carbon dioxide, with the remainder of the gas stream being hydrocarbons and water. This gas stream is compressed, cooled by indirect heat exchange and passed through a desiccant-type drying zone. The gas stream is then passed into a packed fractionation column and separated to produce a net bottoms stream comprising about 345 moles/hr of hydrogen sulfide and less than 1 mole/hr carbon dioxide. The net overhead vapor stream of the column contains about 93 mole percent carbon dioxide and 6.0 mole percent hydrogen sulfide together with a small amount of hydrocarbon. This stream is admixed with the feed gas stream as the recycle gas stream. The fractionation column is operated at a pressure of about 400 psig with a design bottoms temperature of about 100° F. and overhead vapor temperature of approximately 18° F. The overhead system of the column is designed to operate at a reflux to feed ratio near 3:1.

I claimed as my invention:

1. A process for removing hydrogen sulfide from a gas stream containing carbon dioxide which comprises the steps of:
   (a) contacting a hereinafter characterized recycle stream and a feed stream which comprises hydrogen sulfide and carbon dioxide with a lean acid gas absorbing liquid in an absorption zone operated at absorption-promoting conditions and separating a resultant rich acid gas absorbing liquid from a product gas stream;
   (b) passing rich acid gas absorbing liquid from said absorption zone into a regeneration zone operated at regeneration conditions and thereby forming lean acid gas absorbing liquid, which is returned to the absorption zone, and a net regeneration zone gas stream comprising hydrogen sulfide and carbon dioxide; and,
   (c) fractionating the regeneration zone gas stream in the absence of absorbing liquid in a fractionation zone operated at fractionating conditions and therein separating the same into a net fractionation zone overhead stream, which is at least partially employed as said recycle stream, and a net bottoms stream comprising hydrogen sulfide.

2. The process of claim 1 further characterized in that the feed gas stream comprises natural gas.

3. The process of claim 1 further characterized in that the regeneration zone gas stream is passed through a drying zone operated at drying conditions prior to being passed into the fractionation zone.

4. The process of claim 3 further characterized in that the net bottoms stream of the fractionation zone comprises at least 95 mole percent hydrogen sulfide.

5. The process of claim 4 further characterized in that the net bottoms stream of the fractionation zone comprises at least 99 mole percent hydrogen sulfide.

6. The process of claim 5 further characterized in that the fractionation zone comprises a single fractionation column.

7. The process of claim 6 further characterized in that the acid gas absorbing liquid comprises an aqueous amine solution.

8. The process of claim 1 further characterized in that the feed stream is a binary mixture of hydrogen sulfide and carbon dioxide.

9. A gas treating process which comprises the steps of:
   (a) passing a hereinafter characterized gas recycle stream and a feed gas stream comprising a light hydrocarbon, hydrogen sulfide and carbon dioxide into an adsorption zone operated at absorption-promoting conditions and upward therein countercurrent to an acid gas absorbing liquid and separating a resultant rich acid gas absorbing liquid stream from a sweetened product gas stream;
   (b) passing the rich acid gas absorbing liquid stream into a stripping zone operated at stripping conditions and thereby forming a lean acid gas absorbing liquid stream, which is passed into the absorption zone, and a stripping zone overhead vapor stream which comprises hydrogen sulfide and carbon dioxide;
   (c) compressing the stripping zone overhead vapor stream;
   (d) fractionating the stripping zone overhead vapor stream in the absence of absorbing liquid in a fractionation zone operated at fractionation conditions and therein separating the same into a net fractionation zone bottoms stream comprising at least 90 mole percent hydrogen sulfide and a net fractionation zone overhead vapor stream having a lower hydrogen sulfide to carbon dioxide mole ratio than the stripping zone overhead vapor stream;
   (e) recycling at least a portion of the net fractionation zone overhead vapor stream to the absorption zone as said recycle gas stream; and,
   (f) withdrawing at least a portion of said net fractionation zone bottoms stream from the process as a hydrogen sulfide product stream.

10. The process of claim 9 further characterized in that the stripping zone overhead vapor stream comprises at least 10 mole percent hydrogen sulfide.

11. The process of claim 10 further characterized in that acid gas absorbing liquid comprises an aqueous amine solution.

12. The process of claim 10 further characterized in that the stripping zone overhead vapor stream is passed through a drying zone before being passed into the fractionation zone.

13. The process of claim 9 further characterized in that the net fractionation zone bottoms stream comprises over 95 mole percent hydrogen sulfide.

14. The process of claim 9 further characterized in that the net fractionation zone bottoms stream contains less than 10 mole percent carbon dioxide.

15. The process of claim 9 further characterized in that the stripping zone overhead vapor stream is dried prior to passage into the fractionation zone by contact with a solid desiccant.

16. The process of claim 15 further characterized in that the solid desiccant is regenerated through the use of pressure swing regeneration.

17. The process of claim 16 further characterized in that gas released during the depressurization of the desiccant bed being regenerated is passed into a compressor used to pressurize the stripping zone overhead vapor stream.

* * * * *